Sept. 22, 1964  L. W. BELL  3,149,414
EJECTOR KEY
Filed April 14, 1961
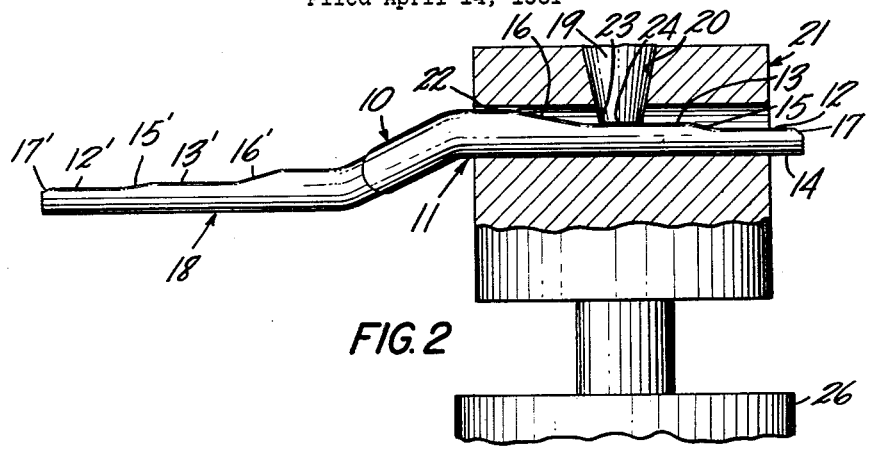
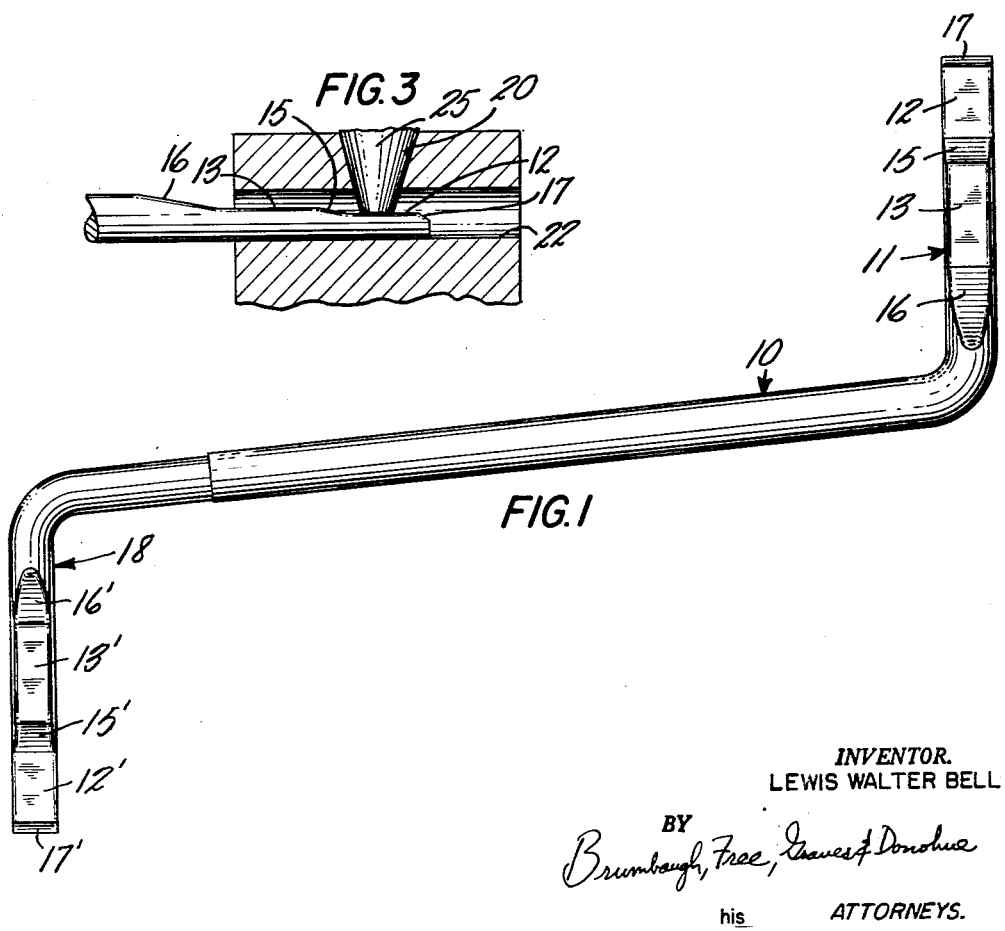
INVENTOR.
LEWIS WALTER BELL
BY
Brumbaugh, Free, Graves & Donohue
his ATTORNEYS.

United States Patent Office 3,149,414
Patented Sept. 22, 1964

3,149,414
EJECTOR KEY
Lewis Walter Bell, Monroe, N.Y., assignor to Star Expansion Industries Corporation, Mountainville, N.Y., a corporation of Delaware
Filed Apr. 14, 1961, Ser. No. 103,695
1 Claim. (Cl. 29—278)

This invention relates to ejector keys for removing a tool or driven element from a driving chuck and, more particularly, to an ejector key having a new and improved structure.

Certain types of tool holders or chucks are provided with a tapered hole and the tool to be mounted in a chuck of this type has a correspondingly tapered surface adapted to be inserted in the hole. In order to remove the tool from the hole after use, an ejector key is inserted into a transverse passage in the chuck and forced between the end of the tool and the chuck body. Conventional ejector keys have a wedge-shaped end which is either driven into the transverse passage by hammer blows, or is rotated within the passage so as to separate the tool from the chuck.

With the conventional wedge-shaped key structures, however, only one point at the edge of the rear surface of the tool is engaged by the key and if repeated attempts are made to remove a firmly locked tool with a key of this type, the rear portion of the tool becomes deformed and distorted, so that the tool is difficult or impossible to remove from the chuck. This problem has been encountered particularly with regard to the broken-off head portion of self-drilling shields which cannot generally be removed from the chuck in any way other than by use of an ejector key.

Accordingly, it is an object of the present invention to provide a new and improved ejector key which overcomes the above-mentioned disadvantages of the prior art.

Another object of the invention is to provide a new and improved ejector key which engages a relatively large portion of the rear surface of a tool.

A further object of the invention is to provide a key of the above character arranged to produce increased leverage for removing a tool from a chuck.

These and other objects of the invention are attained by forming one end of an elongated key member with a first surface extending parallel to the axis of the member at a given diametral distance from the opposite side of the member and a second surface adjacent to the first surface also extending parallel to the axis of the member at a diametral distance from the opposite side of the member greater than the given distance.

Preferably, the first and second surfaces are both flat and are joined by a flat, sloping surface while another flat sloping surface may extend from the second surface to the adjacent peripheral portion of the key member. In addition, an arm may extend away from the key member at an angle to its axis and, at the opposite end of this arm, another key member having a different diameter may be mounted with its axis parallel to that of the first key member thereby providing a key for chuck passages of a different size. This arrangement provides a crank handle to apply leverage to either key when it is used.

Further objects and advantages of the invention will be apparent from a reading of the following description in conjunction with the accompanying drawings in which:

FIG. 1 is a plan view of a representative form of ejector key arranged in accordance with the invention;

FIG. 2 is an end view, partly in section, showing the use of the ejector key in removing a tool from a chuck, and;

FIG. 3 is a fragmentary view similar to that of FIG. 2 illustrating the use of the ejector key in removing a tool with a longer head portion from a chuck.

In the typical embodiment of the invention shown in FIG. 1, the ejector key comprises a cylindrical metal shaft or rod having a central arm 10 and a key member 11 extending at an angle from one end of the arm 10 formed with two adjacent flat surface portions 12 and 13. As best seen in FIG. 2, the flat surface 12 closer to the end of the key member 11 extends parallel to the axis of the key member so that the distance from the surface 12 to the center of the surface 14 at the other side of the member is equal to less than the diameter of the cylindrical rod.

Moreover, the surface 13 of the key member, which also extends parallel to the axis of the member, is disposed farther from the end of the member than the surface 12 and is spaced at a greater distance from the opposite side 14 of the rod. In addition, a sloping surface 15 extending at an angle to the axis of the key member joins the surfaces 12 and 13 and another sloping surface 16 extends from the flat surface 13 to the adjacent periphery of the key member. Furthermore, the edge at the end of the surface 12 is chamfered to provide a sloping surface 17 and the edges along the sides of both flat surfaces are slightly rounded. With this arrangement, the combination of the sloping surfaces 15, 16 and 17, as viewed from the end of the key member, provides a sequential wedge-type key wherein the wedge surface portions are separated by the spaced surfaces 12 and 13 which are parallel to the axis of the member.

At the other end of the arm 10, there is another key member 18 which is made from a smaller diameter portion of the metal shaft and projects approximately parallel to the member 11 but in the opposite direction from the arm 10. This key member is formed with two flat surfaces 12' and 13', which are parallel to the axis of the member, and three sloping surfaces 15', 16', and 17', which are similar in all respects to the corresponding surfaces of the member 11.

By virtue of this unique structure, the novel ejector key of the invention may be used as shown in FIGS. 2 and 3 with improved effectiveness to remove a tool having a tapered head 19 from a tapered hole 20 in a chuck 21 which is affixed to the operating end of a power hammer 26 or the like. First, the ejector key member 11 or 18 having a diameter which is closest to the diameter of the transverse passage 22 in the chuck is inserted into the passage 22 and pushed in as far as it will go so that the edge 23 of the rear surface of the tool is engaged by one of the sloping surfaces 15, 16, or 17. The ejector key is then turned by grasping the key member at the opposite end of the arm 10 (the member 18 in FIG. 2) and giving it a quick tug. If the tool head 19 is not firmly locked in the chuck, the camming action of the sloping surface against the rear edge of the tool will be sufficient to dislodge it without appreciable deformation or distortion.

On the other hand, if the tool head 19 has become firmly locked in the chuck, the rotation of the sloping surface against the edge of the tool head will force the key member outwardly in the passage 22 a short distance until the nearest flat surface (the surface 13 in FIG. 2) lies adjacent to the rear surface 24 of the tool head. Further rotation of the ejector key in the manner of a crank will force the rounded side edge portion of the adjacent flat surface against the inner surface 24 of the tool along a line extending completely across the surface. By thus distributing the extracting force across the entire inner surface, the pressure applied to the tool at any given point is not great enough to cause deformation thereof, but at the same time the force applied to the tool head 19 is large enough to dislodge even if it is firmly secured in the chuck. Moreover, since the two key members 11 and 18 extend in opposite directions from the arm 10, the ejector key can be rotated completely in either direction without any interference from the power hammer 26. For this reason, the chuck 21 does not have to be removed from the power hammer 26 when a tool is being dislodged with the ejector key of the invention.

If a tool head 25, as shown in FIG. 3, extends farther into the transverse passage 22 than the head 19 of FIG. 2, the sloping surface 15 or the parallel surface 12 of the ejector key can be used to eject the tool in the same manner as described above.

In accordance with the present invention, therefore, a stepped ejector key is provided by which even the most tightly locked tool can be removed from a chuck without deformation or damage. Moreover, if desired, the key can be used in same manner as a conventional wedge-shaped ejector key to extract a tool by a hammer blow at the outer end of the key member and, because of the shape of the ejector key, the ejector key can be rotated in the manner of a crank without coming in contact with a power hammer on which the chuck is mounted.

Although the invention has been described herein with reference to a specific embodiment, many modifications and variations therein will readily occur to those skilled in the art. Accordingly, all such variations and modifications are included within the scope of the invention as defined by the following claim.

I claim:

An ejector key for removing a tool from a tool holder comprising a first elongated key member having a generally cylindrical outer surface and formed with a first surface adjacent to one end thereof and extending parallel to the axis of the key member at a selected diametral distance from the opposite side of the member and a second surface adjacent to the first surface and extending at an angle to the axis of the key member at a distance from the opposite side of the member which is increasingly greater than the selected distance, an arm extending from the other end of the key member at an angle to the axis thereof, and a second elongated key member affixed to the arm having an axis parallel to that of the first key member but laterally displaced therefrom so as to provide a crank arm for the first key member, the second key member being formed with at least one surface extending parallel to the axis thereof.

References Cited in the file of this patent

UNITED STATES PATENTS

| | | |
|---|---|---|
| D. 45,277 | Vaughan | Feb. 17, 1914 |
| 1,786,029 | Phillips | Dec. 23, 1930 |
| 2,040,663 | Mallet et al. | May 12, 1936 |
| 2,435,306 | Grotnes | Feb. 3, 1948 |